United States Patent [19]

Sloan

[11] Patent Number: 4,668,149
[45] Date of Patent: May 26, 1987

[54] ARTICLE DEPOSITING APPARATUS

[75] Inventor: Harry W. Sloan, Charlotte, N.C.

[73] Assignee: Samac, Inc., Charlotte, N.C.

[21] Appl. No.: 808,336

[22] Filed: Dec. 12, 1985

[51] Int. Cl.⁴ .............................................. B65G 57/06
[52] U.S. Cl. ........................................ 414/80; 53/540;
 198/424; 198/468.8; 271/192; 414/907
[58] Field of Search ....................... 414/48, 49, 68, 69,
 414/80, 81, 907; 271/177, 180, 192; 53/540;
 198/424, 468.8

[56] References Cited

U.S. PATENT DOCUMENTS

| 3,014,599 | 12/1961 | Lawrence et al. | 414/80 X |
| 3,219,201 | 11/1965 | Hollenton | 414/80 X |
| 3,406,966 | 10/1968 | Walton | 414/907 X |
| 4,551,052 | 11/1985 | Pattarozzi | 414/80 X |

FOREIGN PATENT DOCUMENTS

| 2161575 | 7/1972 | Fed. Rep. of Germany | 414/81 |
| 2223005 | 2/1973 | Fed. Rep. of Germany | 53/540 |

Primary Examiner—Leslie J. Paperner
Attorney, Agent, or Firm—Shefte, Pinckney & Sawyer

[57] ABSTRACT

Apparatus for automatically depositing parallelepipedic articles into an upwardly open collecting hopper, carton or the like, including a pair of article support members pivoted in spaced opposed facing relation, the support members respectively having spaced upper and lower jaw members defining respective opposed channel areas. The support members reciprocate in synchronous opposed pivotal movement between an article supporting position wherein their channel areas open in facing relation for receiving and supporting articles at their lateral sides on the lower jaw members and an article depositing position wherein the channel areas open downwardly for releasing the articles to drop gravitationally into the hopper or carton. The upper jaw members are adapted to engage the upper lateral surfaces of the supported articles immediately upon release of the articles by the lower jaw members with sufficient force to engage and propel the articles downwardly during continued pivotal movement of the support member at a slightly greater speed than the initial acceleration of the articles due to gravity. In this manner, the support members maintain and deposit the articles in the hopper or carton in their original orientation as supported by the support members without misalignment or damage to the articles.

13 Claims, 7 Drawing Figures 4,668,149

ARTICLE DEPOSITING APPARATUS

BACKGROUND OF THE INVENTION

The present invention relates generally to apparatus for depositing an article in a desired orientation into an upwardly opening collecting hopper or the like and, more particularly, to such apparatus specifically adapted for automatically collating and depositing articles in groups such as in a carton packing operation.

Many apparatus are known for automatically depositing manufactured packages or other articles in a packing case or carton or in an intermediate collecting hopper for subsequent packing in a case or carton. Representative examples of various conventional types of such packing apparatus are disclosed and illustrated in U.S. Pat. Nos. 1,946,283; 2,956,384; 2,996,856; 3,621,765; 3,653,178; 3,673,756; 3,783,584; 4,086,745; 4,192,121; and 4,506,493. Typically, apparatus of this general type are specifically designed and adapted for handling particular types, sizes and shapes of manufactured articles, as the above-listed patents illustrate. Further representative examples of conventional packing apparatus are the BURRY-LU Model 1083 and the SLOAN Model C-400 collating apparatus manufactured by Sloan Engineering and Manufacturing Corporation of Charlotte, N.C., the assignee hereof, which apparatus are specifically designed for collating and delivering parallelepipedic articles such as ice cream sandwiches to a collecting hopper of an associated carton packing apparatus.

In a large number of conventional apparatus of the general type identified above, a movable support arrangement is provided on which articles to be packaged are initially arranged in a desired orientation and which is then moved to permit the articles to drop gravitationally in some sort of constrained manner to be deposited in the same orientation into a carton or collecting hopper below the support arrangement. Normally, a conveyor and a control switch system are provided to deliver the articles to the support arrangement and to operate the movement thereof in an automated manner. As will be appreciated, the reliable operation of the support arrangement to maintain the articles in their desired orientation during gravitational dropping thereof is essential to the operation of these packing apparatus and it is this aspect of such apparatus that produces the greatest degree of operational problems in such apparatus.

It is accordingly a broad object of the present invention to provide a simple and reliable mechanical support arrangement for depositing articles in a desired orientation by dropping onto a receiving surface therebelow, such as an upwardly open collecting hopper. More particularly, the present apparatus is specifically directed to an improved apparatus of the type of the aforementioned BURRY-LU Model 1083 and SLOAN Model C-400 apparatus.

SUMMARY OF THE INVENTION

Briefly and most basically described, the apparatus of the present invention includes a pair of article support members pivotably arranged in horizontally spaced opposed facing relation to one another about respective substantially horizontal axes, the support members respectively having vertically spaced upper and lower jaw members defining respective opposed channel areas for receiving opposite lateral sides of an article. An actuating arrangement is provided for actuating synchronous opposed pivotal movement of the support members about their axes between an article supporting position wherein the channel areas open in facing relation for supporting the article at its lateral sides on the lower jaw members and an article depositing position wherein the channel areas open downwardly for releasing the article to drop downwardly. According to the present invention, the channel areas are of a selected vertical dimension slightly greater than the vertical thickness of the article at its lateral sides and the actuating arrangement is operable to pivot the support members at a sufficient rotational speed for engagement of the upper jaw members with the upper lateral surfaces of the article immediately upon release of the article by the lower jaw members to engage and direct the article downwardly during continued pivotal movement of the support members to maintain and deposit the article in its original orientation as supported by the support members.

In the preferred embodiment of the present apparatus, the apparatus is adapted for automatically depositing parallelepipedic articles in groups into the upwardly open collecting hopper of a carton packing apparatus or the like. The preferred apparatus includes a frame adapted to be mounted in assembly with the carton packing apparatus and an article delivery conveyor mounted on the frame for orienting and transporting a plurality of the articles successively in single-file alignment to a delivery location. The article support members are mounted on the frame at the delivery location and directly above the collecting hopper with their pivot axes extending along opposite sides of the collecting hopper. In the article supporting position of the support members, their channel areas are in alignment with the conveyor at the delivery location for receiving and supporting a group of the articles. The support members are specifically designed to operate between their article supporting and article depositing positions to cause the upper jaw members to engage the upper lateral surfaces of the group of articles upon release thereof by the lower jaw members with sufficient force to propel the group of articles downwardly during continued movement of the support members at a slightly greater speed than the initial acceleration of the group of articles due to gravity thereby to maintain and deposit the group of articles in their original orientation as supported by the support members. A switch assembly is mounted on the frame to be engaged by the leading one of the group of articles when the group is received within the channel areas of the support members in their article supporting position, the switch assembly being operatively associated with the actuating arrangement for automatic operation thereof to pivot the support members to their article depositing position when the switch means is so engaged.

Preferably, the support members include upwardly-extending stop plates at the side thereof facing the conveyor to prevent further movement thereon of successive articles toward the support members during pivotal movement of the support members between their article supporting and article depositing positions. The upper jaw members of the support members have convexly-curved downwardly facing surfaces for gentle progressive engagement of the upper lateral surfaces of the articles during movement of the support members from the article supporting position to the article depositing position. The upper jaw members also preferably extend toward one another to a greater extent than the lower jaw members to achieve the desired engagement with the upper lateral surfaces of the supported articles.

DESCRIPTION OF THE PREFERRED EMBODIMENT

Figure 1:
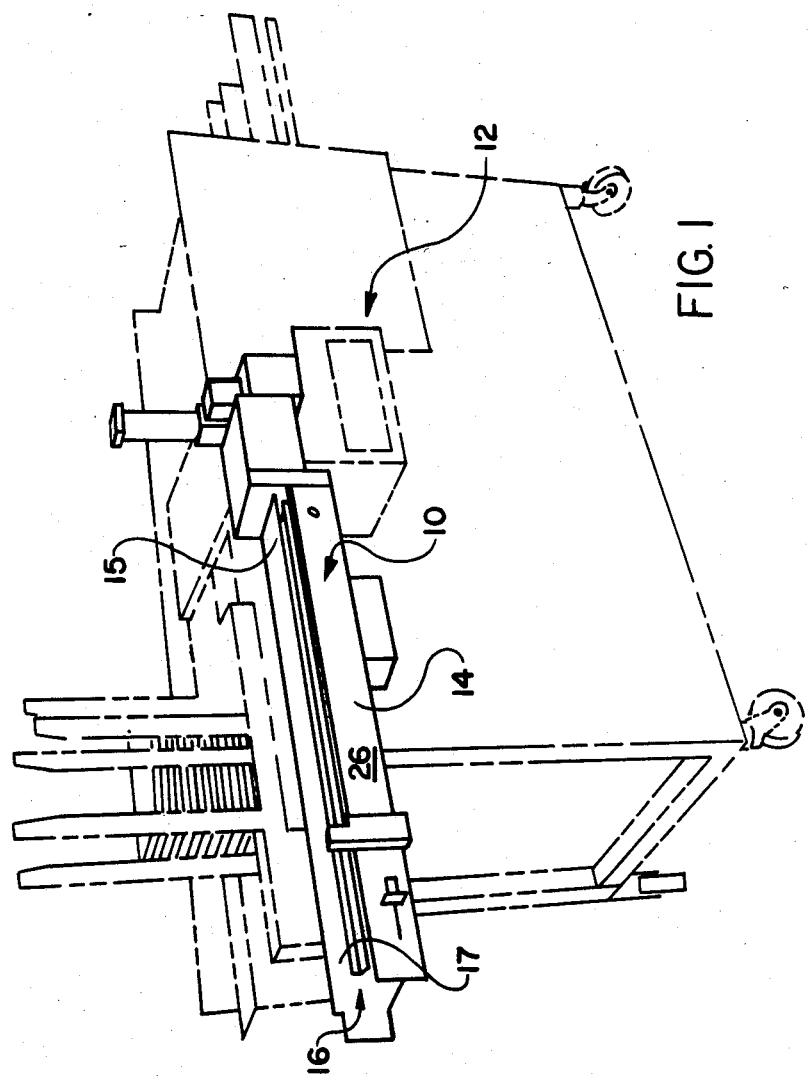
FIG. 1 is a perspective view of the article depositing apparatus of the present invention as preferably embodied in assembly with an associated carton packing apparatus.

Referring now to the accompanying drawings and initially to FIG. 1, the article depositing apparatus of the present invention is indicated in full lines generally at 10 in the preferred embodiment thereof in operative assembly with a conventional carton packing apparatus indicated in phantom lines generally at 12.

Figure 2:
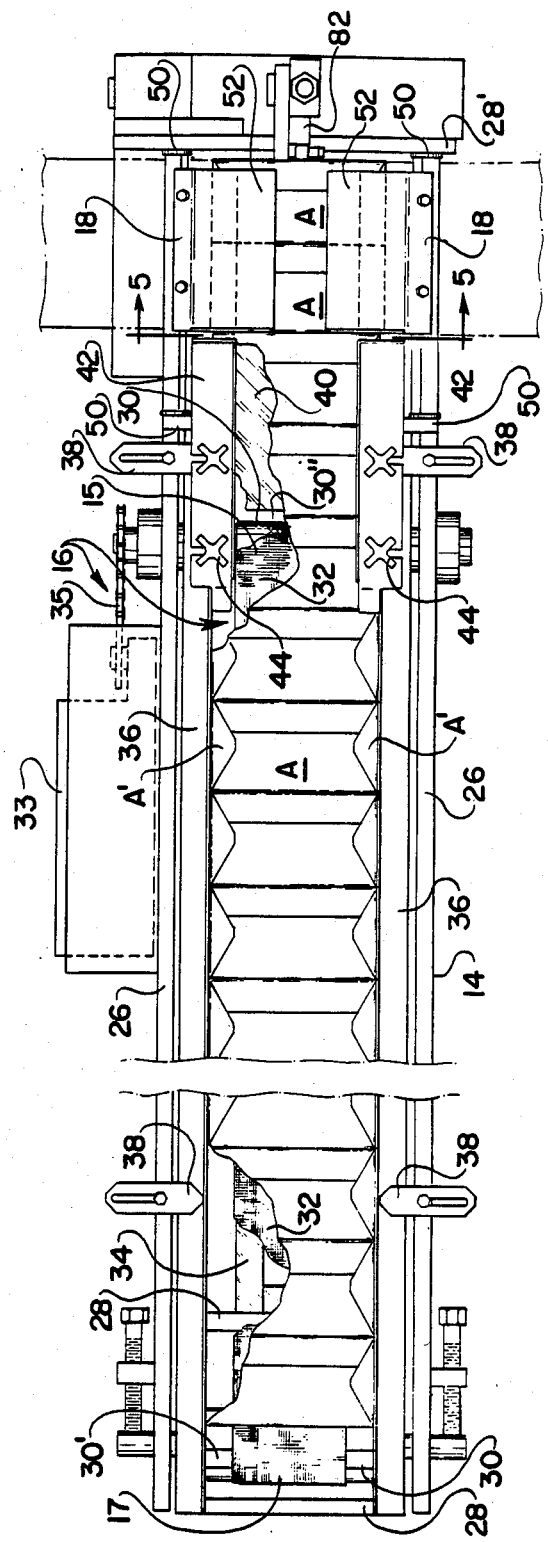
FIG. 2 is a top plan view of the article depositing apparatus of FIG. 1.
Figure 3:
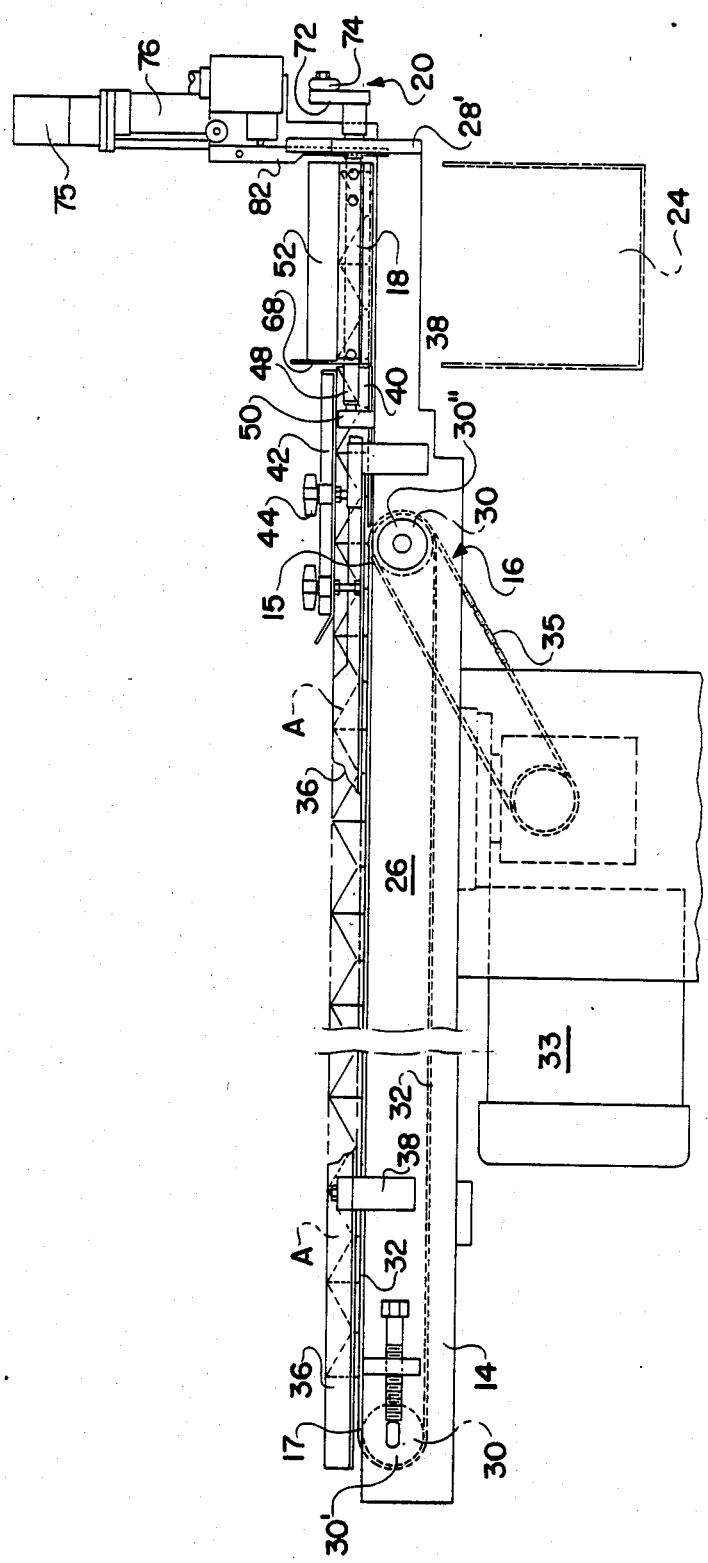
FIG. 3 is a side elevational view of the article depositing apparatus of FIG. 1.

As shown in FIGS. 1-3, the article depositing apparatus 10 basically includes a frame 14, a conveyor assembly indicated generally at 16 mounted on the frame 14 for orienting and transporting a plurality of articles A successively in single file alignment to a delivery location indicated at 15, a pair of article supporting and depositing members 18 pivotably mounted to the frame 14 at the delivery end 15 thereof for receiving the articles A, an actuating mechanism indicated generally at 20 (FIG. 4) for actuating pivotal movement of the support members 18 between article supporting and article depositing positions (FIGS. 5-7), and a control switch arrangement indicated generally at 22 for controlling operation of the actuating mechanism 20. The carton packing apparatus 12 in pertinent part includes an article receiving hopper 24, representatively shown in FIG. 3, disposed immediately below the support members 18 of the article depositing apparatus 10. The hopper 24 is open at its opposite lateral sides, a box or carton forming mechanism (not shown) being provided at one open side of the hopper 24 for forming and positioning an open carton thereat for receiving articles deposited in the hopper 24, and a ram mechanism (also not shown) being provided at the other open side of the hopper 24 for periodically pushing deposited articles from the hopper 24 into a carton prepared by the carton forming mechanism.

The article depositing apparatus 10 is preferably and particularly adapted for handling parallelepipedic articles, specifically ice cream sandwiches. For this purpose, the carton packing apparatus 12 is preferably of a compatible type such as the Mastercraft Cartonmaster CM-5, manufactured and sold by Mastercraft International, Inc., of Charlotte, N.C. However, it will be understood by those persons skilled in the art that the present article depositing apparatus is of a much broader utility and is susceptible of use with many other types of articles as well as with other types of carton packing apparatus. In fact, it is contemplated that the present article depositing apparatus may be utilized, if desired, to deposit articles directly into a carton rather than into intermediate hopper of a carton packing apparatus. Accordingly, it is to be understood that the present description of the particular preferred embodiment of the article depositing apparatus of the present invention is exemplary and illustrative of the present invention solely for purposes of providing a full and enabling disclosure of the best mode of practicing the present invention and is not to be interpreted as limiting the scope of the present invention.

The frame 14 of the article depositing apparatus 10 basically includes a pair of longitudinal side frame members 26 fixed in horizontally-extending spaced parallel facing relation by several cross-members 28 extending transversely therebetween at the opposite ends thereof and at spacings therealong. The conveyor assembly 16 includes a pair of cylindrical rolls 30 extending transversely between and rotatably journaled in the side members 26 at spaced locations therealong, one roll 30' being disposed at the article intake end 17 of the frame 14 and the other roll 30" being disposed at a slight spacing from the opposite article discharge end 15 of the frame 14. An endless conveyor belt 32 is trained about the rolls 30 and a suitable electric motor 33 is mounted on one side member 26 of the frame 14 in driving relation with the roll 30" through an endless drive chain 35 for causing the upper run of the conveyor belt 32 to travel in the direction from the intake end 17 to the discharge end 15 of the frame 14. A pair of the cross members 28 extend between the upper and lower runs of the conveyor belt 32 and have a pair of longitudinally-extending struts 34 extending therebetween to support the upper run of the conveyor belt 32 in a substantially linear path of movement between the rolls 30. A support plate 40 is affixed transversely between the side rails 26 immediately adjacent the roll 30" in a horizontal disposition in coplanar alignment with the upper run of the conveyor belt 32 to receive and support the articles A transported along and discharged from the conveyor belt 32. A pair of longitudinal guide rails 36 are affixed to the frame 14 by several upstanding support brackets 38 mounted respectively to the side members 26 at spacing therealong to support the guide rails 36 to extend longitudinally along opposite lateral sides of the upper run of the conveyor belt 32 and along the support plate 40 at a spacing between the guide rails 36 corresponding closely to the longitudinal dimension of the articles A. A pair of guide plates 42 are mounted respectively to the guide rails 36 by threaded knobs 44 in substantially parallel relation with the support plate 40 at a spacing thereabove corresponding closely to the vertical thickness of the articles A to operate in conjunction with the guide rails 36 to insure proper alignment and orientation of the articles A upon discharge from the conveyor belt 32 and in preparation for delivery to the support members 18.

Figure 5:
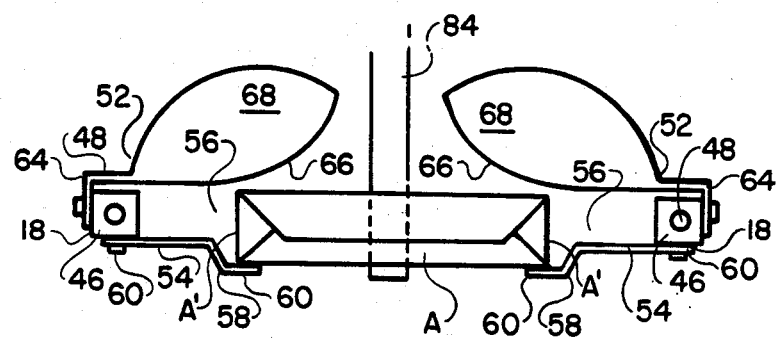
FIGS. 5-7 are vertical cross-sectional views of the article depositing apparatus of FIG. 1 taken along line 5—5 of FIG. 2, illustrating the article support members in sequential stages of their pivotal movement between their article supporting and article depositing positions.
Figure 6:
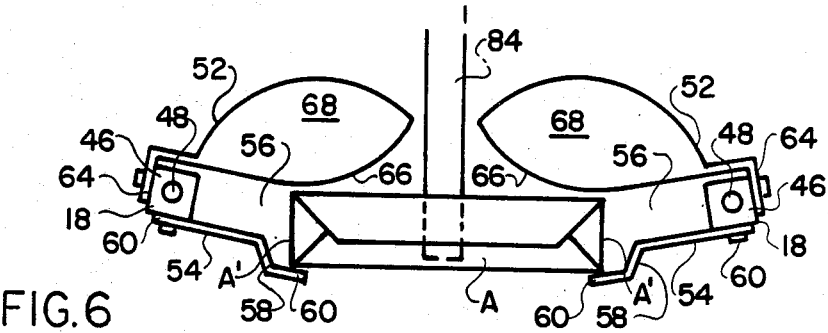
Figure 7:
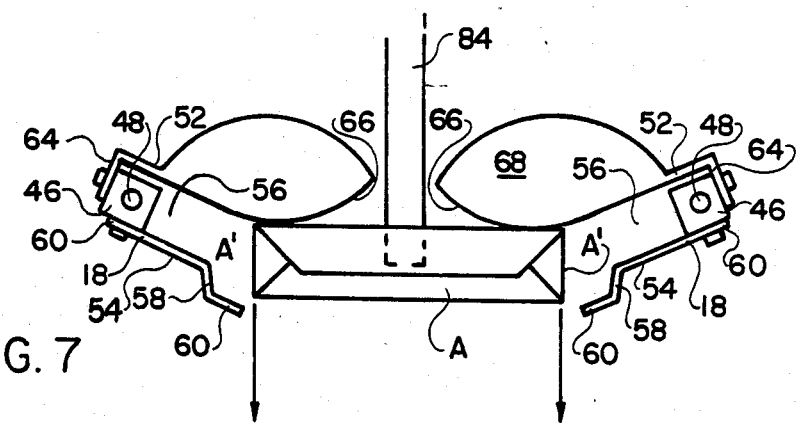

As seen in FIGS. 5-7, each of the support members 18 includes a longitudinal mounting block 46 having operating shafts 48 at its opposite ends by which the support members 18 are pivotably journaled at opposite sides of the frame 14 at its discharge end 15 in the cross member 28' thereat and in upright support brackets 50 respectively affixed to the side members 26 to dispose the support members 18 in horizontally spaced opposed facing relation to one another about respective substantially horizontal axes defined by the operating shafts 48.

Each of the support members 18 includes an upper jaw member 52 and a lower jaw member 54 affixed to its mounting block 46 and extending in spaced relation inwardly toward the other support member 18 to define an article-receiving channel area 56 opening toward the other support member 18. Each lower jaw member 54 is formed of a flat planar plate having a longitudinally-formed step portion 58 therein separating a flat mounting portion 60 by which the lower jaw member 54 is bolted in horizontal disposition to the lower surface of its mounting block 46 and a flat article-supporting ledge portion 62 extending horizontally in parallel relation with the mounting portion 60 at a slightly lower level. The upper jaw member 52 of each support member 18 is formed from a flat plate having an L-shaped bend formed at 64 along one edge thereof by which the upper jaw member 52 is bolted to the outwardly facing surface of its mounting block 46, with the projecting extent of the plate of the upper jaw member 52 extending horizontally in spaced relation to the lower jaw member 54 and being arcuately curved 66 at the free end thereof away from the lower jaw member 54. The support members 18 are spaced apart with the distance between the step portions 58 of their lower jaw members 54 corresponding to the longitudinal dimension of the articles A, and the upper and lower jaw members 52,54 are of corresponding longitudinal dimension to be adapted to support simultaneously a plurality of the articles A, e.g. a group of two articles A as shown in FIGS. 2 and 3 or groups of three or four articles A, in abutting side-by-side relationship. Each upper jaw member 52 also has a stop plate 68 affixed to the upper surface of its arcuate portion 66 at the end of the jaw member 52 facing the conveyor assembly 16 with the stop plate 68 extending in perpendicular relation to the arcuate portion 66 and transversely relative to the longitudinal extent of the conveyor assembly 16.

Figure 4:
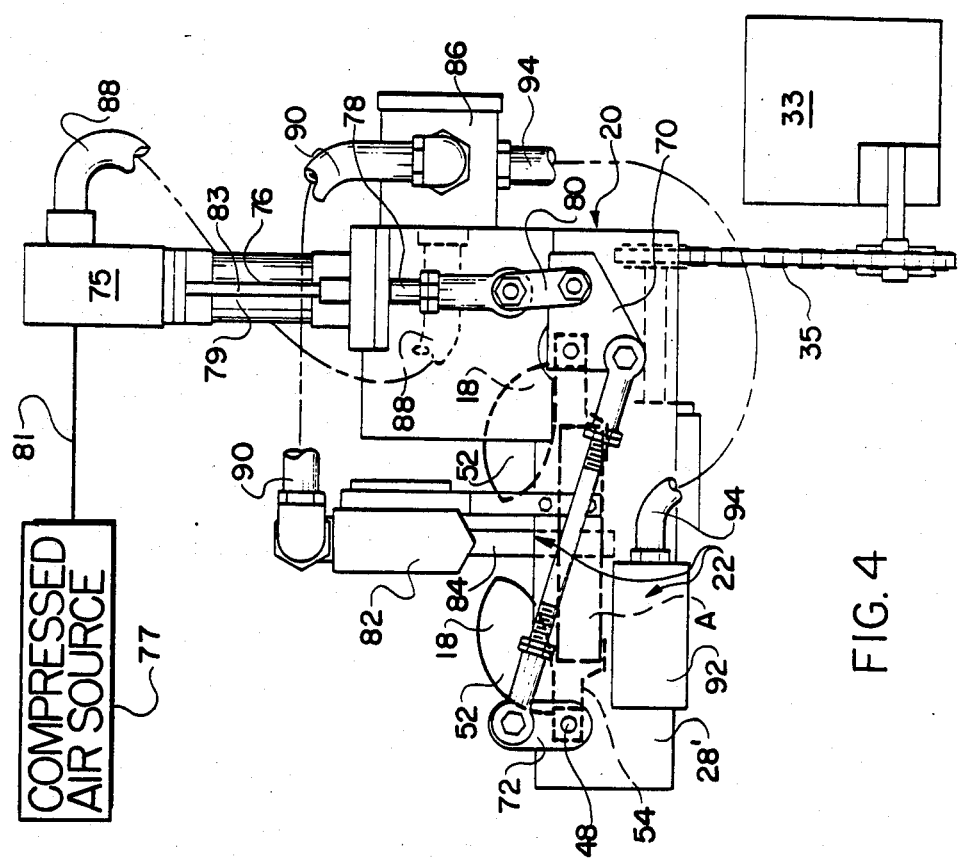
FIG. 4 is a right end elevational view of the article depositing apparatus of FIG. 1.

The actuating mechanism 20 is best seen in FIG. 4 and includes a pair of cranks 70,72 respectively affixed to the ends of the operating shafts 48 of the support members 18 projecting through the cross member 28' and a connecting link 74 pivotably affixed at its opposite ends to and extending between the cranks 70,72 to constrain the support members 18 to synchronous opposed pivotal movement about their respective operating shaft axes. A piston and cylinder assembly 76 is mounted on the frame 14 immediately above the crank 70 and has the projecting end of its piston 78 pivotably affixed to the crank 70 through a connecting arm 80 for controlling the opposed pivotal movement of the support members 18 through the longitudinal reciprocation of the piston 78. The stroke of the piston 78 is of a predetermined extent sufficient to actuate the opposed pivotal movement of the support members 18 to pivotably reciprocate them between an article supporting position, shown in FIG. 5, wherein the channel areas 56 of the support members 18 open toward one another in opposed facing relation with the ledge portions 62 of the lower jaw members 54 in coplanar alignment with the upper run of the conveyor belt 32 and with the support plate 40 for receiving and supporting the articles A delivered by the conveyor assembly 16 at their lateral sides A' on the ledge portions 62 of the lower jaw members 54 of the support members 18, and an article depositing position, shown in FIG. 7, wherein the channel areas 56 of the support members 18 open downwardly for releasing the articles A to drop gravitationally downwardly into the hopper 24 of the carton packing apparatus 12. As will be understood, the piston and cylinder assembly 76 is arranged to actuate movement of the support members 18 into their article supporting position of FIG. 5 upon extension of the piston 78 and to pivot the support members 18 into their article depositing position of FIG. 7 by withdrawal of the piston 78. Preferably, the piston and cylinder assembly 76 is of the conventional air-operated double-acting type. The piston and cylinder assembly 76 includes a self-contained electrically-operated valve assembly 75, preferably a four-way solenoid-type valve assembly, mounted to the upper extending end of the piston and cylinder assembly 76. The valve assembly 75 communicates with a source of compressed air 77 through an air line 81 and, in turn, communicates with the opposite ends of the cylinder 79 of the piston and cylinder assembly 76 through a tube 83 extending along the cylinder 79.

The control switch arrangement 22 includes a main switch box 86 in which is contained a normally open electrical control switch (not shown) for operating the valve assembly 75 of the piston and cylinder assembly 76, this control switch for the piston and cylinder assembly 76 being electrically connected with the valve assembly 75 of the piston and cylinder assembly 76 through a cable 88 extending between the switch box 86 and the valve assembly 75 for operating the valve assembly 75 to withdraw its piston 78 when the valve assembly control switch is closed and to extend the piston 78 when the valve assembly control switch is opened. The control switch arrangement 22 includes a normally-open electrical limit switch assembly 82 mounted on the cross member 28' of the frame 14 on the side thereof facing the conveyor assembly 16 in disposition for switch-closing contact of its actuating arm 84 with the articles A when they are delivered by the conveyor assembly 16 into the channel areas 56 of the support members 18 in their article supporting position of FIG. 5. The limit switch assembly 82 is electrically connected with the control switch to the valve assembly 75 of the piston and cylinder assembly 76 by a cable 90 extending between the limit switch assembly 82 and the main switch box 86 for closing the valve assembly control switch and, in turn, operating the valve assembly 75 to actuate the withdrawal stroke of the piston and cylinder assembly 76 upon each switch closing movement of the actuating arm 84. Another normally-open limit switch assembly 92 is mounted on the outward surface of the cross member 28' adjacent the crank 72 in position for switch-closing contact with the crank 72 when the support members 18 are in their article depositing position of FIG. 7. The limit switch 92 is electrically connected with the control switch for the valve assembly 75 of the piston and cylinder 76 through a cable 94 extending between the limit switch 92 and the main switch box 86 for opening the control switch to the valve assembly 75 and, in turn, operating the valve assembly 75 to actuate the extension stroke of the piston 78 upon each closing of the limit switch 92. In this manner, the actuating mechanism 20 normally maintains the support members 18 in their article supporting position of FIG. 5 and is operative to actuate reciprocation of the support members 18 to their article depositing position of FIG. 7 and back to the article supporting position of FIG. 5 upon each switch closing operation of the limit switch assembly 82. Operating electrical power is supplied to the control switch for the valve assembly 75 through a cable (not shown) extending into the main switch box 86.

In operation, the conveyor motor 33 and the main switch box 86 are energized with an appropriate supply of operating electrical power, whereby the conveyor belt 32 begins running continuously while electrical power is supplied to the input contact of the normally open control switch to the valve assembly 75 of the piston and cylinder assembly 76 to enable it for operation upon any closing of the limit switch assembly 82. Parallelepipedic articles A, such as ice cream sandwiches or similar packaged food articles or the like, are delivered one-by-one from a wrapping machine (not shown) onto the upper run of the conveyor belt 32 in the vicinity of the intake roll 30' with the articles A oriented to extend laterally end-to-end between the guide rails 36. The conveyor belt 32 transports the articles A successively toward the discharge end of the frame 14 and delivers the articles A onto the support plate 40 whereat each delivered article A is confined laterally between the guide rails 36 and above and below between the guide plates 42 and the support plate 40 to insure that the articles A are maintained in their desired orientation. As the conveyor belt 32 delivers successively following articles A onto the support plate 40, the leading articles A are pushed along the support plate 40 and therefrom between the support members 18 to be received at the lateral sides A' of the articles A within the channel areas 56 of the support members 18 to rest at the lateral sides of the articles A on the ledge portion 62 of the lower jaw members 54 of the support members 18.

When the successively following articles A from the conveyor belt 32 have pushed the two leading articles A as a group into the channel areas 56 of the support members 18 in this manner, the leading article A engages the actuating arm 84 and closes the limit switch assembly 82 which in turn operates to close the valve assembly control switch within the switch box 86 to operate the valve assembly 75 to the piston and cylinder assembly 76 to actuate withdrawal of its piston 78 to in turn actuate synchronous pivotal movement of the support members 18 downwardly from the initial article supporting position of FIG. 5, through the intermediate position of FIG. 6, and finally to the article depositing position of FIG. 7, thereby permitting the articles A to drop into the hopper 24. When the support members 18 reach the article depositing position of FIG. 7, the crank 72 of the actuating mechanism 20 comes into switch closing contact with the limit switch 92 which in turn operates to reopen the valve assembly control switch within the switch box 86 to operate the valve assembly 75 to the piston and cylinder assembly 76 to actuate re-extension of the piston 78 to return the support members 18 to their original article supporting position of FIG. 5. During this reciprocal movement of the support members 18, the stop plates 68 thereof are brought into disposition across the discharge end of the support plate 40 to prevent further movement toward the support members 18 of the successively following articles A on the support plate 40. Upon return of the support members 18 to their original article supporting position, the described cycle of operation begins again and is repeated continuously thereafter for so long as a continuous supply of the articles A is delivered to the support members 18 from the conveyor assembly 16.

It is a particular feature of the present invention that the support members 18 are uniquely operative in their described pivotal movement from their article supporting position to their article depositing position to control the release of the articles A to drop in their same orientation as supported by the support members 18 in the article supporting position. With reference particularly to FIGS. 5-7, it will be understood that, as the support members 18 pivot from the article supporting position of FIG. 5 to the article depositing position of FIG. 7, the vertical dimension between the ledge portion 62 and the curved portion 66 of the lower and upper jaw members 52,54 of each support member 18 progressively decreases. Accordingly, the dimension perpendicularly between the ledge portion 62 and the curved portion 66 of the jaw members 52,54 of each support member 18 is selected to be slightly greater than the vertical thickness of the articles A sufficiently to prevent the jaw members 52,54 from pinching or otherwise damaging the supported lateral sides A' of the articles A during such pivotal movement of the support members 18, but the increase in this dimension of the support members 18 over the thickness of the articles A is sufficiently limited to insure that the curved portion 66 of the upper jaw members 52 of the support members 18 comes into engagement with the upper lateral surfaces of the articles A just as the ledge portions 62 of the lower jaw members 54 release the articles A. For this purpose, the upper jaw members 52 extend laterally inwardly toward one another to a greater extent than the lower jaw members 54. According to the present invention, the actuating mechanism 20 is arranged to cause the piston and cylinder assembly 76 to retract its piston 78 on its withdrawal stroke at a sufficient speed to cause the curved portion 66 of the upper jaw members 52 to engage the upper lateral surfaces of the articles A during the described pivotal movement of the support members 18 with sufficient force to engage and propel the supported articles A downwardly during continued pivotal movement of the support members 18 following release of the articles A by the lower jaw members 54 at a slightly greater speed than the initial acceleration of the articles A due to gravity. The arcuate configuration of the curved portions 66 of the upper jaw members 52 thus acts to gently direct the articles A downwardly in a controlled manner tending to maintain them in their same orientation as supported in the article supporting position of the support members 18. In this manner, the support members 18 operate to insure that the articles A are deposited in the hopper 24 without any misalignment of, and importantly without any damage to, the articles A. The operation of the depositing apparatus 10 in this manner is capable of higher production rates, as well as being gentler, more reliable and less costly, then the manual collating and packaging of the articles A.

As those persons skilled in the art are aware, carton packing apparatus such as the apparatus 10 may be set up to operate the ram mechanism thereof at varying intervals so as to permit, if desired, several groups of the articles A to be deposited in the hopper 24 before each operation of the ram mechanism. For this purpose, the main switch box 86 may be provided with a counter mechanism which is electrically connected to the operating switch for the ram mechanism of the carton packing apparatus to actuate the ram mechanism at predetermined intervals in relation to the number of switch closing operations of the valve assembly operating switch in the main switch box 86 indicating the number of article depositing reciprocations of the support members 18. Of course, as previously mentioned, it is also contemplated that the article depositing apparatus 10 could be adapted to deposit the articles A directly into a box, carton or other desired container, or directly onto a conveyor.

To facilitate the adjustment of the article depositing apparatus 10 to accommodate different sizes of articles A, slotted mounting connections are utilized to mount the guide rails 36 to the frame 14, to mount the guide plates 42 to the guide rails 36, and to mount the upper jaw 52 to the mounting blocks 46, to adjust to articles A of different lengths and thicknesses. Additionally, the jaw members 52,54 and the support plate 40 are adapted for easy replacement by corresponding components to enable the apparatus 10 to be modified to collate the articles A in groups of differing numbers of the articles A. Of course, those persons skilled in the art will recognize that many other modifications may be made to the apparatus 10 without departing from the substance and scope of the present invention.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. Apparatus for depositing a relatively rigid article in a desired orientation onto a receiving surface, comprising a pair of article support members pivotably arranged in horizontally spaced opposed facing relation to one another about respective substantially horizontal axes, said support members respectively having vertically spaced upper and lower jaw members defining respective opposed channel areas for receiving opposite lateral sides of said article, and means for actuating synchronous opposed pivotal movement of said support members about their said axes between an article supporting position wherein said channel areas open in facing relation for supporting said article at its said lateral sides on said lower jaw members and an article depositing position wherein said channel areas open downwardly for releasing said article to drop downwardly, said channel areas being of a selected vertical dimension slightly greater than the vertical thickness of said article at its said lateral sides so that said upper jaw members are out of engagement with said article in said article supporting position and said actuating means being operable to pivot said support members at a sufficient rotational speed for initial engagement of said upper jaw members with the upper lateral surfaces of said article immediately upon release of said article by said lower jaw members to engage and direct said article downwardly during continued pivotal movement of said support members to maintain and deposit said article in its original orientation as supported by said support members.

2. Apparatus for depositing an article in a desired orientation onto a receiving surface according to claim 1 and characterized further in that said upper jaw members have convexly-curved downwardly facing surfaces for gentle progressive engagement of said upper lateral surface of said article during movement of said support members from said article supporting position to said article depositing position.

3. Apparatus for depositing an article in a desired orientation onto a receiving surface according to claim 1 and characterized further in that said upper jaw members extend toward one another to a greater extent than said lower jaw members.

4. Apparatus for depositing an article in a desired orientation onto a receiving surface according to claim 1 and characterized further by conveyor means oriented in line with said channel areas of said support members in their said article supporting position for delivering plural articles successively to said support members.

5. Apparatus for depositing an article in a desired orientation onto a receiving surface according to claim 1 and characterized further in that said support members include upwardly-extending stop plates at the side thereof facing said conveyor means to prevent further movement thereon of successive articles toward said support members during pivotal movement of said support members between said article supporting position and said article depositing position.

6. Apparatus for depositing an article in a desired orientation onto a receiving surface according to claim 1 and characterized further by switch means disposed to be engaged by said article when received within said channel areas of said support members in their said article supporting position and operatively associated with said actuating means for automatic operation thereof to pivot said support members to said article depositing position when said switch means is engaged.

7. Apparatus for depositing an article in a desired orientation onto a receiving surface according to claim 1 and characterized further in that said channel areas of support members are dimensioned to receive a plurality of articles for deposit as a group onto said receiving surface.

8. Apparatus for depositing an article in a desired orientation onto a receiving surface according to claim 5 and characterized further by switch means disposed to be engaged by said article when received within said channel areas of said support members in their said article supporting position and operatively associated with said actuating means for automatic operation thereof to pivot said support members to said article depositing position when said switch means is engaged.

9. Apparatus for depositing an article in a desired orientation onto a receiving surface according to claim 8 and characterized further in that said channel areas of support members are dimensioned to receive a plurality of articles for deposit as a group onto said receiving surface.

10. Apparatus for depositing an article in a desired orientation onto a receiving surface according to claim 1 and characterized further in that said actuating means is operable to pivot said support members at a sufficient rotational speed that said initial engagement of said upper jaw members with the upper lateral surfaces of said article is with sufficient force to propel said article downwardly during continued pivotal movement of said support members at a slightly greater speed than the initial acceleration of said article due to gravity thereby to maintain and deposit said article in its original orientation as supported by said support members.

11. Apparatus for automatically depositing groups of relatively rigid parallelepipedic articles into an upwardly open collecting hopper of a carton packing apparatus or the like, comprising a frame adapted to be mounted in assembly with said carton packing apparatus, article delivery conveyor means mounted on said frame for orienting and transporting a plurality of said articles successively in single-file alignment to a delivery location, a pair of article support members pivotably mounted on said frame at said delivery location and directly above said collecting hopper in horizontally spaced opposed facing relation to one another about respective substantially horizontal axes extending along opposite sides of said collecting hopper, said support members respectively having vertically spaced upper and lower jaw members defining respective opposed channel areas for receiving opposite lateral sides of a group of said plural articles arranged in abutment in said single-file alignment, means for actuating synchronous opposed pivotal movement of said support members about their said axes between an article supporting position wherein said channel areas open in facing relation and in alignment with said conveyor means at said delivery location for receiving and supporting one said group of said articles at their said lateral sides on said lower jaw members and an article depositing position wherein said channel areas open downwardly for releasing said group of said articles to drop downwardly into said collecting hopper, said channel areas being of a selected vertical dimension slightly greater than the vertical thickness of each said article at its said lateral sides so that said upper jaw members are out of engagement with said article in said article supporting position and said actuating means being operable to pivot said support members at a sufficient rotational speed for initial engagement of said upper jaw members with the upper lateral surfaces of said group of said articles immediately upon release of said group of said articles by said lower jaw members with sufficient force to engage and propel said group of said articles downwardly during continued pivotal movement of said support members at a slightly greater speed than the initial acceleration of said group of said articles due to gravity thereby to maintain and deposit said group of said articles into said collecting hopper in their original orientation as supported by said support members, and switch means mounted on said frame to be engaged by the leading one of said group of said articles when said group is received within said channel areas of said support members in their said article supporting position and operatively associated with said actuating means for automatic operation thereof to pivot said support member to said article depositing position when said switch means is engaged.

12. Apparatus for automatically depositing groups of parallelepipedic articles into an upwardly open collecting hopper of a carton packing apparatus or the like according to claim 11 and characterized further in that said support members include upwardly-extending stop plates at the side thereof facing said conveyor means to prevent further movement thereon of successive articles toward said support members during pivotal movement of said support members between said article supporting position and said article depositing position.

13. Apparatus for automatically depositing groups of parallelepipedic articles into an upwardly open collecting hopper of a carton packing apparatus or the like according to claim 12 and characterized further in that said upper jaw members have convexly-curved downwardly facing surfaces for gentle progressive engagement of said upper lateral surface of said article during movement of said support members from said article supporting position to said article depositing position and said upper jaw members extend toward one another to a greater extend than said lower jaw members.

* * * * *